US012795454B2

(12) United States Patent
Chellasamy et al.

(10) Patent No.: US 12,795,454 B2
(45) Date of Patent: Nov. 10, 2026

(54) METHODS AND SYSTEM FOR DYNAMICALLY ADJUSTING PRODUCER NETWORK FUNCTION (NF) SERVICE-BASED INTERFACE (SBI) RESPONSE MESSAGE PROCESSING TIMEOUTS

(71) Applicant: Oracle International Corporation, Redwood Shores, CA (US)

(72) Inventors: Iyappan Chellasamy, Bangalore (IN); Gaurav Chadha, Gurgaon (IN); Amit Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 142 days.

(21) Appl. No.: 18/816,840

(22) Filed: Aug. 27, 2024

(65) Prior Publication Data

US 2026/0067752 A1 Mar. 5, 2026

(51) Int. Cl.
*H04W 28/18* (2009.01)
*H04L 67/51* (2022.01)
(Continued)

(52) U.S. Cl.
CPC ............ *H04W 28/18* (2013.01); *H04L 67/51* (2022.05); *H04W 48/16* (2013.01)

(58) Field of Classification Search
None
See application file for complete search history.

(56) References Cited

U.S. PATENT DOCUMENTS 10,592,317 B2 3/2020 Baines et al.
11,140,047 B2 10/2021 Shan
(Continued)

FOREIGN PATENT DOCUMENTS

CN 114980200 A 8/2022
IN 202241006739 A 11/2023

OTHER PUBLICATIONS

"3rd Generation Partnership Project; Technical Specification Group Services and System Aspects; Procedures for the 5G System (5GS); Stage 2 (Release 18)", 3GPP TS 23.502, V18.6.0, pp. 1-717 (Jun. 2024).

(Continued)

*Primary Examiner* — Jenee Holland
(74) *Attorney, Agent, or Firm* — Jenkins, Taylor & Hunt, P.A.

(57) ABSTRACT

A method for dynamically adjusting and using producer network function (NF) service-based interface (SBI) response timeout values includes transmitting, by a sending NF and to a producer NF, a first SBI request message. The method further includes receiving, by the sending NF and from the producer NF, a maximum SBI request message processing time value. The method further includes dynamically adjusting, by the sending NF and based on the maximum SBI request message processing time value, an SBI response timeout value for the producer NF. The method further includes transmitting, by the sending NF and to the producer NF, a second SBI request message. The method further includes using, by the sending NF, the SBI response timeout value for the producer NF to determine when to indicate that a transaction associated with the second SBI request message has timed out.

20 Claims, 6 Drawing Sheets

(51) Int. Cl.

| | |
|---|---|
| ***H04L 69/28*** | (2022.01) |
| ***H04W 48/16*** | (2009.01) |
| ***H04W 48/18*** | (2009.01) |

(56) References Cited

U.S. PATENT DOCUMENTS

| | | | | |
|---|---|---|---|---|
| 11,811,863 | B2 | 11/2023 | Shariat | |
| 11,917,016 | B2 | 2/2024 | Krishan | |
| 12,500,826 | B2 | 12/2025 | Sofuoglu | |
| 2018/0262924 | A1 | 9/2018 | Dao et al. | |
| 2019/0222489 | A1 | 7/2019 | Shan | |
| 2020/0288296 | A1 | 9/2020 | Fiorese et al. | |
| 2020/0313999 | A1 | 10/2020 | Lee et al. | |
| 2021/0021494 | A1 | 1/2021 | Yao et al. | |
| 2023/0033997 | A1* | 2/2023 | Askerup | H04L 67/55 |
| 2023/0042219 | A1* | 2/2023 | Singh | H04W 48/16 |
| 2023/0065199 | A1 | 3/2023 | Khare et al. | |
| 2023/0171182 | A1 | 6/2023 | Goel et al. | |
| 2023/0217355 | A1* | 7/2023 | Srivastava | H04L 41/0654 370/329 |
| 2023/0269608 | A1 | 8/2023 | Puente Pestana | |
| 2023/0300200 | A1 | 9/2023 | Krishan | |
| 2023/0359528 | A1 | 11/2023 | Mouroulis et al. | |
| 2024/0031430 | A1 | 1/2024 | Shariat | |
| 2024/0172035 | A1 | 5/2024 | Chunduri et al. | |
| 2024/0187878 | A1 | 6/2024 | Chu et al. | |
| 2024/0298225 | A1 | 9/2024 | Hyde et al. | |
| 2024/0348523 | A1 | 10/2024 | Sofuoglu | |
| 2025/0184238 | A1 | 6/2025 | Singh et al. | |
| 2025/0203433 | A1 | 6/2025 | Kheirkhah et al. | |
| 2025/0267070 | A1 | 8/2025 | An et al. | |
| 2026/0067193 | A1 | 3/2026 | Rajput et al. | |
| 2026/0122142 | A1 | 4/2026 | Rajput et al. | |

OTHER PUBLICATIONS

"3rd Generation Partnership Project; Technical Specification Group Services and System Aspects; System architecture for the 5G System (5GS); Stage 2 (Release 19)", 3GPP TS 23.501, V19.0.0, pp. 1-722 (Jun. 2024).

"3rd Generation Partnership Project; Technical Specification Group Core Network and Terminals; 5G System; Technical Realization of Service Based Architecture; Stage 3 (Release 18)", 3GPP TS 29.500, V18.6.1, pp. 1-151 (Aug. 2024).

"3rd Generation Partnership Project; Technical Specification Group Core Network and Terminals; 5G System; Network Function Repository Services; Stage 3 (Release 18)", 3GPP TS 29.510 V18.7.0, pp. 1-426 (Jun. 2024).

3rd Generation Partnership Project; Technical Specification Group Core Network and Terminals; 5G System; Network Function Repository Services; Stage 3 (Release 19) 3GPP TS 29.510 V19.0.0 (Sep. 2024).

3rd Generation Partnership Project; Technical Specification Group Core Network and Terminals; 5G System; Technical Realization of Service Based Architecture; Stage 3 (Release 19) 3GPP TS 29.500 V19.0.0 (Sep. 2024).

3rd Generation Partnership Project; Technical Specification Group Core Network and Terminals; 5G System; Session Management Policy Control Service; Stage 3 (Release 19) 3GPP TS 29.512 V19.0.0 (Sep. 2024).

3rd Generation Partnership Project; Technical Specification Group Core Network and Terminals; 5G System; Binding Support management Service; Stage 3 (Release 19) 3GPP TS 29.521 V19.0.0 (Sep. 2024).

3rd Generation Partnership Project; Technical Specification Group Core Network and Terminals; 5G System; Usage of the Unified Data Repository service for Policy Data, Application Data, and Structured Data for Exposure; Stage 3 (Release 19) 3GPP TS 29.519 V19.0.1 (Sep. 2024).

3rd Generation Partnership Project; Technical Specification Group Core Network and Terminals; 5G System; Spending Limit Control Service; Stage 3 (Release 19) 3GPP TS 29.594 V19.0.0 (Sep. 2024).

"5G; 5G System; Session Management Services; Stage 3 (3GPP TS 29.502 version 16.6.0 Release 16)", ETSI TS 129 502, V16.6.0, pp. 1-283 (Jan. 2021).

"Clarifications for Indirection Communications", Nokia, 3GPP TSG-CT WG4 Meeting #99e, E-Meeting, C4-204189, pp. 1-5 (Aug. 18-28, 2020).

"5G; 5G System; Technical Realization of Service Based Architecture; Stage 3 (3GPP TS 29.500 version 15.3.0 Release 15)", ETSI TS 129 500, V15.3.0, pp. 1-36 (Jul. 2019).

"3rd Generation Partnership Project; Technical Specification Group Core Network and Terminals; 5G System; Technical Realization of Service Based Architecture; Stage 3 (Release 18)", 3GPP TS 29.500, V18.7.0, pp. 1-151 (Sep. 2024).

Commonly-assigned, co-pending U.S. Appl. No. 19/009,897 for "Methods, Systems, and Computer Readable Media for Intelligent Admission Control in Service-Based Interface Network Functions" (Unpublished, filed Jan. 3, 2025).

Commonly-assigned, co-pending U.S. Appl. No. 18/826,073 for "Methods, Systems, and Computer Readable Media for Network Analytics Data Director (NADD)-Assisted Producer Network Function (NF) Selection" (Unpublished, filed Sep. 5, 2024).

Commonly-assigned, co-pending U.S. Appl. No. 18/934,178 for "Methods, Systems, and Computer Readable Media for Network Analytics Data Director (NADD)-Informed Automatic Configuration of Maximum Response Times," (Unpublished, filed Oct. 31, 2024).

Esfandiari, "Powering the Autonomous 5G Core", Pipeline Publishing, L.L.C., vol. 19, Issue 11, pp. 1-4 (2023).

Nadar, et al., "Enhancing Network Data Analytics Functions: Integrating AlaaS with ML Model Provisioning", 2024 22nd Mediterranean Communication and Computer Networking Conference (MedComNet). IEEE, pp. 1-4 (2024).

Garcia-Martin, et al., "Network automation and data analytics in 3gpp 5g systems." IEEE Network 38.4 (2023): 182-189.

Chouman, et al., "A Modular, End-to-End Next-Generation Network Testbed: Towards a Fully Automated Network Management Platform", arXiv.org, arXic:2403.15376v1, pp. 1-47 (Mar. 22, 2024).

Fielding, et al., "Hypertext Transfer Protocol (HTTP/1.1): Message Syntax and Routing", Internet Engineering Task Force (IETF), RFC 7230 (Jun. 2014).

"3rd Generation Partnership Project; Technical Specification Group Core Network and Terminals, 5G System; Network Function Repository Services; Stage 3 (Release 19)", 3GPP TS 29.510, V19.0.0, pp. 1-435 (Sep. 2024).

"3rd Generation Partnership Project; Technical Specification Group Core Network and Terminals; 5G System; Technical Realization of Service Based Architecture; Stage 3 (release 18)", 3GPP TS 29.500, V18.6.0, pp. 1-151 (Jun. 2024).

Non-Final Office Action for U.S. Appl. No. 18/826,073 (Feb. 19, 2026).

Notice of Allowance for U.S. Appl. No. 18/934,178 (Apr. 20, 2026).

Notification of Transmittal of the International Search Report and the Written Opinion of the International Searching Authority, or the Declaration for International Patent Application Serial No. PCT/US2025/059711 (Apr. 21, 2026).

* cited by examiner

METHODS AND SYSTEM FOR DYNAMICALLY ADJUSTING PRODUCER NETWORK FUNCTION (NF) SERVICE-BASED INTERFACE (SBI) RESPONSE MESSAGE PROCESSING TIMEOUTS

TECHNICAL FIELD

The subject matter described herein relates to SBI message processing. More particularly, the subject matter described herein relates to methods, systems, and computer readable media for dynamically adjusting producer NF SBI response message processing timeouts at an SCP or a consumer NF.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF service instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF service instance. It should also be noted that multiple NF service instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances or alternate routes traffic among producer NF service instances that provide the required services.

One issue that can arise in 5G, previous generation, and subsequent generation networks is that statically configured message processing timeouts at an SCP or a consumer NF may result in excessive retransmissions of SBI request messages. For example, an SCP or a consumer NF may be configured with a static message processing timeout to apply to a service-based interface (SBI) request message transmitted to a producer NF. When the consumer NF or SCP transmits an SBI request message to a producer NF, and the consumer NF or SCP fails to receive an SBI response message within the message processing timeout period, a message processing timeout occurs, and the consumer NF or SCP is required to retransmit the SBI request message to the same or another producer NF. If the producer NF is available, but has a message processing time that exceeds the configured message processing timeout of the consumer NF or SCP, it may be desirable for the consumer NF or SCP to adjust its configured SBI message processing timeout value to account for the processing time of the producer NF. However, there is currently no mechanism for the consumer NF or SCP to know the message processing time of the producer NF.

Accordingly, in light of these and other difficulties, there exists a need for improved methods, systems, and computer readable media for adjusting an SBI message processing timeout value at a consumer NF or SCP.

SUMMARY

A method for dynamically adjusting and using producer NF SBI response timeout values includes transmitting, by a sending NF and to a producer NF, a first SBI request message. The method further includes receiving, by the sending NF and from the producer NF, a maximum SBI request message processing time value. The method further includes dynamically adjusting, by the sending NF and based on the maximum SBI request message processing time value, an SBI response timeout value for the producer NF. The method further includes transmitting, by the sending NF and to the producer NF, a second SBI request message. The method further includes using, by the sending NF, the SBI response timeout value for the producer NF to determine when to indicate that a transaction associated with the second SBI request message has timed out.

According to another aspect of the subject matter described herein, receiving the maximum SBI request message processing time value includes receiving the maximum SBI request message processing time value in an SBI response message transmitted by the producer NF to the sending NF in response to the first SBI request message.

According to another aspect of the subject matter described herein, receiving the maximum SBI request message processing time value in the SBI response message includes receiving the maximum SBI request message processing time value in a Max-Req-Processing-Time header inserted by the producer NF in the SBI response message.

According to another aspect of the subject matter described herein, the maximum SBI request processing time value is dynamically set by the producer NF based on SBI request processing times of the producer NF.

According to another aspect of the subject matter described herein, the maximum SBI request processing time value is configured at the producer NF based on SBI request processing times of the producer NF.

According to another aspect of the subject matter described herein, dynamically adjusting the SBI response timeout value includes setting, by the sending NF, the SBI response timeout value for the producer NF to be equal to the maximum SBI request processing time value of the producer NF.

According to another aspect of the subject matter described herein, dynamically adjusting the SBI response timeout value includes setting, by the sending NF, the SBI response timeout value for the producer NF to be greater than the maximum SBI request message processing time value of the producer NF.

According to another aspect of the subject matter described herein, the method for dynamically adjusting and using SBI response timeout values for producer NFs includes receiving, by the sending NF and from a plurality of different producer NFs, a plurality of different maximum SBI request message processing time values for the different producer NFs and dynamically setting, by the sending NF and based on the different maximum SBI request message processing time values, different SBI response timeout values for the different producer NFs.

According to another aspect of the subject matter described herein, the sending NF comprises an SCP.

According to another aspect of the subject matter described herein, the sending NF comprises a consumer NF.

According to another aspect of the subject matter described herein, a system for dynamically adjusting and using producer network function (NF) service-based interface (SBI) response timeout values is provided. The system includes a sending NF including at least one processor and a memory. The system further includes an SBI transaction handler stored in the memory and executed by the at least one processor for transmitting, to a producer NF, a first SBI request message, receiving, from the producer NF, a maximum SBI request message processing time value, dynamically adjusting, based on the maximum SBI request message processing time value, an SBI response timeout value for the producer NF, transmitting, to the producer NF, a second SBI request message, and using the SBI response timeout value for the producer NF to determine when to indicate that a transaction associated with the second SBI request message has timed out.

According to another aspect of the subject matter described herein, the SBI transaction handler is configured to receive the maximum SBI request message processing time value in an SBI response message transmitted by the producer NF to the sending NF in response to the first SBI request message.

According to another aspect of the subject matter described herein, the SBI transaction handler is configured to receive the maximum SBI request message processing time value in a Max-Req-Processing-Time header inserted by the producer NF in the SBI response message.

According to another aspect of the subject matter described herein, the maximum SBI request processing time value is dynamically set by the producer NF based on SBI request processing times of the producer NF.

According to another aspect of the subject matter described herein, the maximum SBI request processing time value is configured at the producer NF based on SBI request processing times of the producer NF.

According to another aspect of the subject matter described herein, the SBI transaction handler is configured to dynamically adjust the SBI response timeout value by setting the SBI response timeout value for the producer NF to be greater than or equal to the maximum SBI request message processing time value of the producer NF.

According to another aspect of the subject matter described herein, the SBI transaction handler is configured to receive, from a plurality of different producer NFs, a plurality of different maximum SBI request message processing time values for the different producer NFs and dynamically set, based on the different maximum SBI request message processing time values, different SBI response timeout values for the different producer NFs.

According to another aspect of the subject matter described herein, a non-transitory computer readable medium having stored thereon executable instructions that when executed by a processor of a computer control the computer to perform steps is provided. The steps include transmitting, by a sending network function (NF) and to a NF, a first service-based interface (SBI) request message. The steps further include receiving, by the sending NF and from the producer NF, a maximum SBI request message processing time value. The steps further include dynamically adjusting, by the sending NF and based on the maximum SBI request message processing time value, an SBI response timeout value for the producer NF. The steps further include transmitting, by the sending NF and to the producer NF, a second SBI request message. The steps further include using, by the sending NF, the SBI response timeout value for the producer NF to determine when to indicate that a transaction associated with the second SBI request message has timed out.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
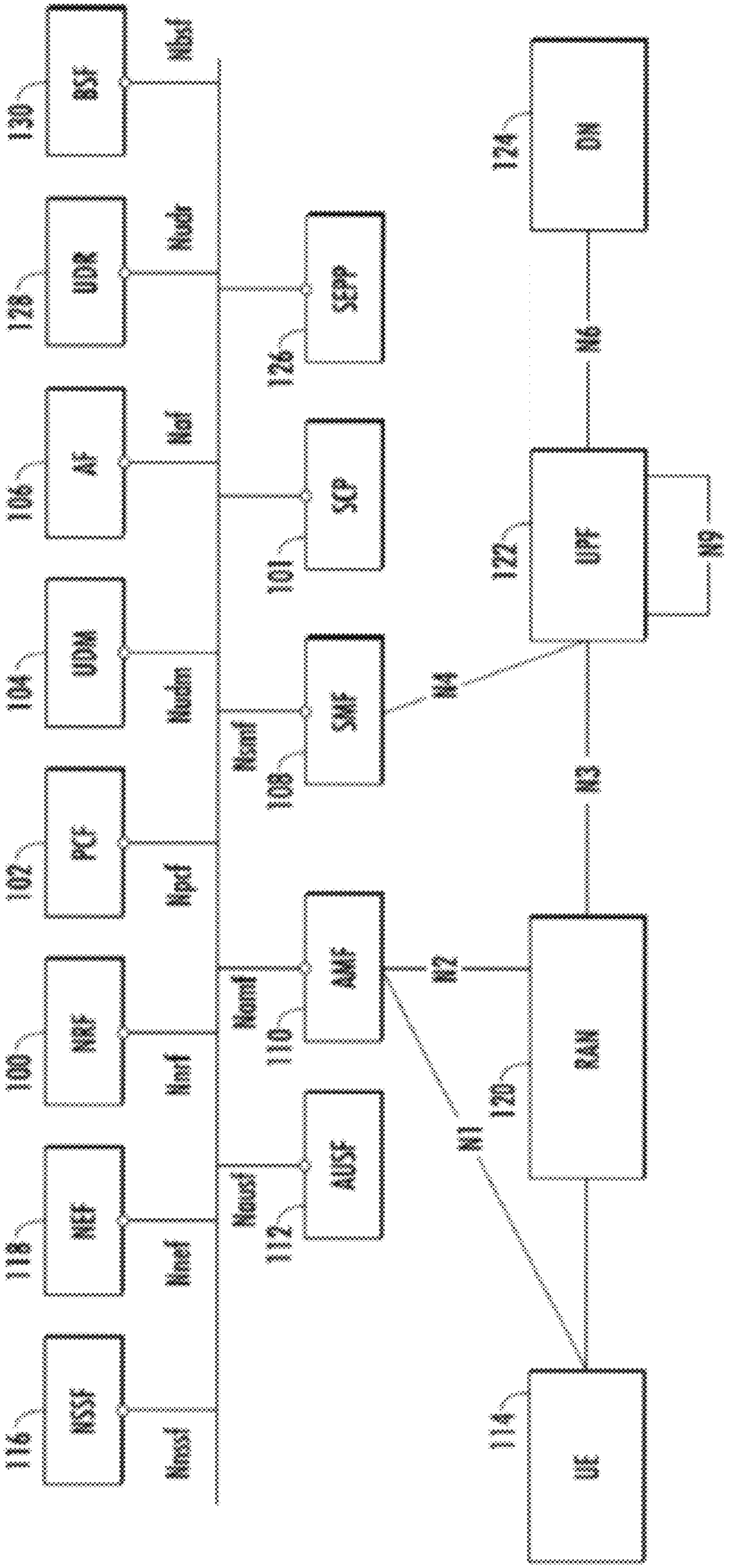
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one issue in 5G, previous generation, and subsequent generation networks is that statically configured timeout values at a consumer NF or SCP may lead to excessive message retransmissions and call processing delays in a network. In 5G networks in particular, the SCP plays a major role in routing messages on behalf of consumer NFs to various producer NFs. Conventional SCP systems face challenges with static routing response timeout configurations, because of varying SBI request message processing times of producer NFs. As these response timeouts are statically configured at the SCP, the SCP knows no details about the present serving capacity (i.e., latency in request processing) dynamics of the producer NFs. These static timeout configurations at the SCP limit the adaptability to changing network conditions and operational requirements. Currently, a consumer NF can communicate the overall 3gpp-Sbi-Max-Rsp-Time to the SCP when making a request to indicate how much time the consumer NF can wait for a response before the consumer NF cancels a transaction. However, producer NFs lack the capability to convey their maximum request processing times to the SCP or to a consumer NF.

Figure 2:
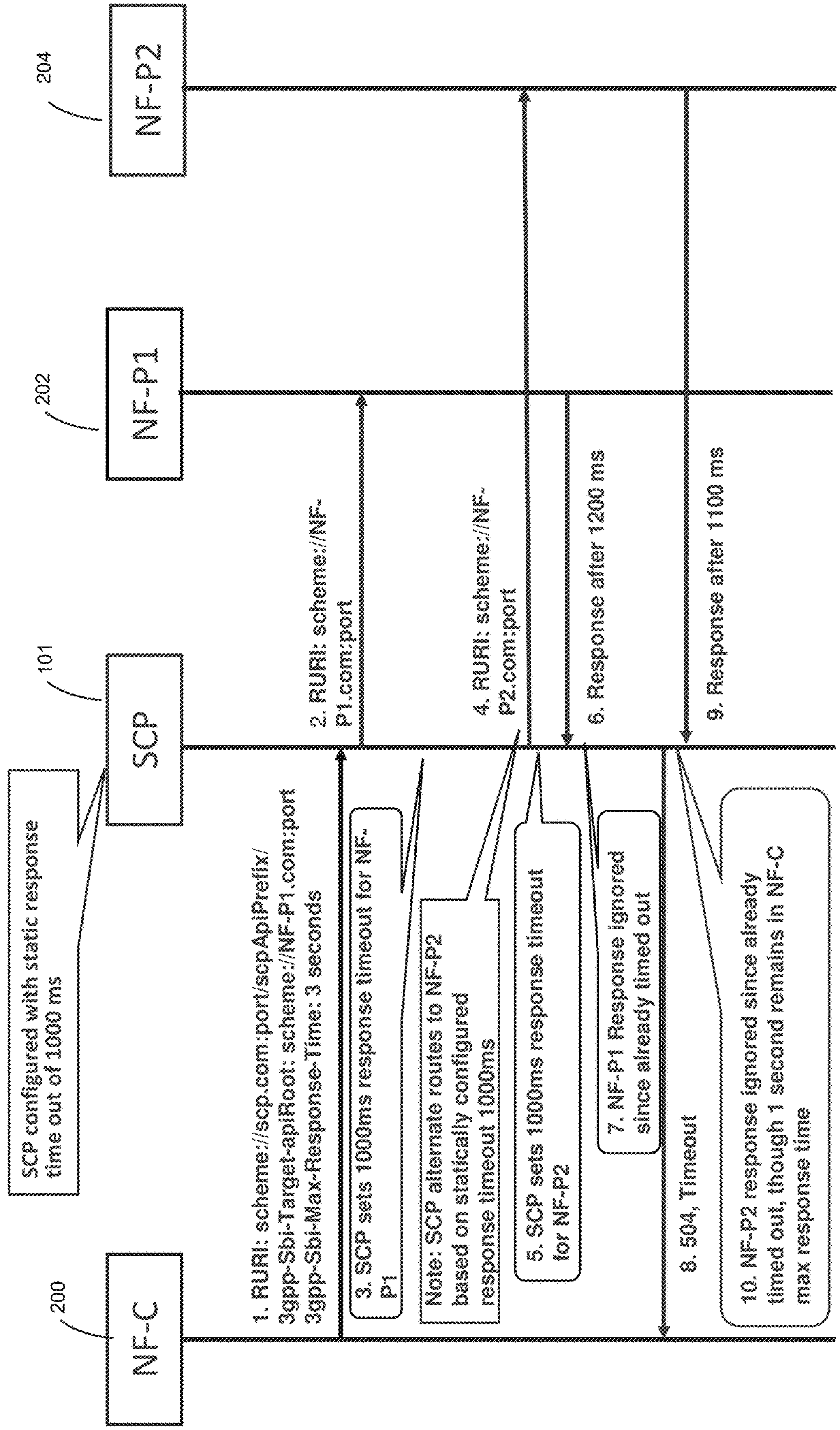
FIG. 2 is a message flow diagram illustrating a problem that occurs when an SCP has a statically configured SBI response timeout value.

FIG. 2 is a message flow diagram illustrating a problem that occurs when an SCP has a statically configured SBI response timeout value. In FIG. 2, SCP 101 is configured with a default static SBI response timeout of 1000 milliseconds. In step 1, NF service consumer 200 sends and SBI request message to SCP 101. The SBI request message includes a 3gpp-Sbi-Target-apiRoot header identifying producer NF 202 as the target or destination. The SBI request message includes a 3gpp-Sbi-Max-Rsp-Time of 3 seconds. SCP 101 receives the SBI request message and, in step 2, communicates the SBI request message to producer NF 202. In step 3, SCP 101 sets a 1000 ms response timeout for the SBI request message sent to producer NF 202. After step 3, a response timeout occurs at SCP 101 because the 1000 ms response timeout expires without SCP 101 receiving a response from producer NF 202. Accordingly, in step 4, SCP 101 alternate routes the SBI request message to producer NF 204. In step 5, SCP 101 sets a 1000 ms response timeout for the SBI request transmitted to producer NF 204. In step 6, producer NF 202 responds to the SBI request message in step 3. The response is received at SCP 101 more than 1200 milliseconds after the initial request was transmitted in step 3. Because the response was received after expiration of the statically configured response timeout of 1000 ms, in step 7, SCP 101 ignores the response. In step 8, SCP 101 sends a 504 timeout response to consumer NF 200. In step 9, producer NF 204 sends a response to SCP 101. The response is received by SCP 101 more than 1100 milliseconds from the transmission of the SBI request in step 4, which is after the response timeout at SCP 101. Accordingly, in step 10, SCP 101 ignores the response received in step 9, even though more than one second exists in the maximum response timeout period communicated to SCP 101 by consumer NF 200.

To reduce the likelihood of unnecessary response timeouts, a producer NF may communicate a maximum SBI request processing time value to consumer NFs or SCPs, where the maximum SBI request processing time value indicates a maximum processing time that the producer NF expects to spend in processing an SBI request. The producer NF may determine the maximum request processing time value algorithmically, for example, by setting the maximum request processing time to the longest time period that the producer NF has taken to process an SBI request message of the last N SBI request messages, where N is a configurable parameter. The consumer NF or SCP receives a response that includes the maximum request processing time value for the producer NF, stores the value in a database, and uses the maximum request processing time value to set a response timeout for an SBI request directed to the producer NF. The consumer NF or SCP may dynamically adjust the SBI response timeout value for the producer NF based on maximum request processing times received from the producer NF in SBI response messages. In addition, the consumer NF or SCP may store different response timeout values for different producer NFs.

Figure 3:
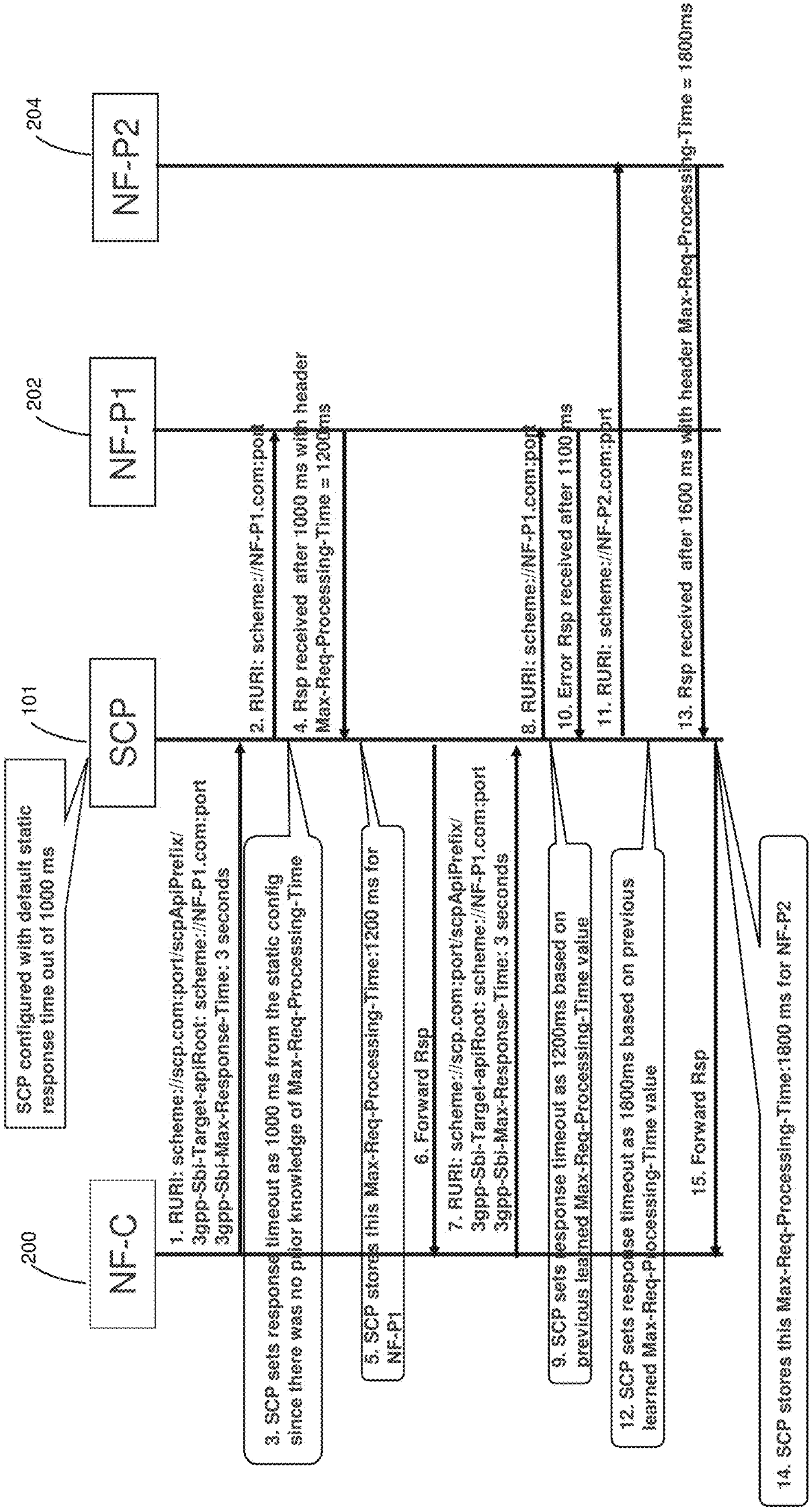
FIG. 3 is a message flow diagram illustrating dynamic adjustment of an SBI response timeout value at an SCP.

FIG. 3 is a message flow diagram illustrating dynamic adjustment of an SBI response timeout at an SCP. Referring to FIG. 3, SCP 101 is initially configured with a default static response timeout value of 1000 milliseconds. In step 1, consumer NF 200 sends an SBI request to SCP 101. The SBI request identifies producer NF 202 as the target and includes a 3gpp-Sbi-Max-Rsp-Time value of 3 seconds. In step 2, SCP 101 forwards the SBI response to producer NF 202. In step 3, SCP 101 sets the response timeout for the transaction associated with the SBI request message to 1000 ms based on the statically configured timeout value because SCP 101 has no prior knowledge of a Max-Req-Processing-Time for producer NF 202. In step 4, producer NF 202 responds to the SBI request in step 2 and includes, in the response, a custom Max-Req-Processing-Time header carrying a maximum SBI request processing time value of 1200 milliseconds. In step 5, SCP 101 stores the Maximum-Req-Processing-Time value of 1200 ms for producer NF 202. In step 6, SCP 101 forwards the SBI response to consumer NF 200.

In step 7, consumer NF 200 sends an SBI request to SCP 101. The SBI request identifies producer NF 202 as the target and includes a 3gpp-Sbi-Max-Rsp-Time value of three seconds. In step 8, SCP 101 forwards the SBI request to producer NF 202. In step 9, SCP 101 sets the SBI response timeout to 1200 milliseconds based on the stored Max-Req-Processing-Time value received from producer NF 202 in step 4. In step 10, producer NF 202 sends an error response to SCP 101. The error response is received by SCP 101 before the 1200 millisecond response timeout occurs. In step 11, SCP 101 alternate routes the SBI request from step 8 to producer NF 204. In step 12, SCP 101 sets the response timeout for the request to producer NF 204 at 1800 milliseconds based on a previous Max-Req-Processing-Time value for producer NF 204. In step 13, at 1600 ms after the SBI request was transmitted in line 11, producer SCP 101 receives an SBI response from producer NF 204. Because the response is received within the response timeout period, SCP 101 processes the response. The SBI response includes a Max-Req-Processing-Time header carrying a value of 1800 milliseconds. In step 14, SCP 101 stores the Max-Req-Processing-Time value of 1800 milliseconds for producer NF 204. In step 15, SCP 101 forwards the SBI response to consumer NF 200.

Figure 4:
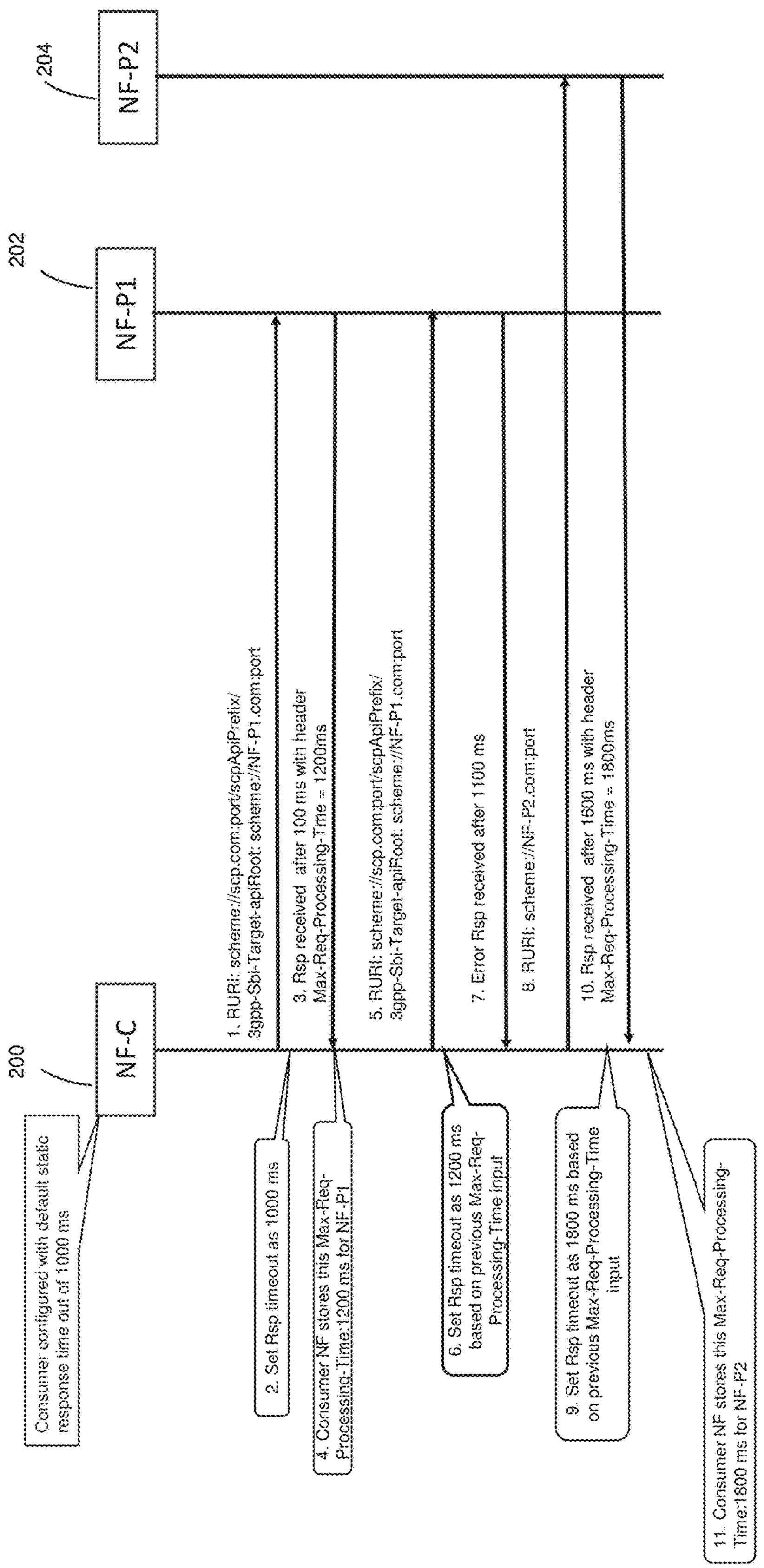
FIG. 4 is a message flow diagram illustrating dynamic adjustment of an SBI response timeout at a consumer NF.

The subject matter described herein is not limited to communicating maximum SBI request processing values to SCPs. In an alternate example, a producer NF may communicate the maximum SBI request processing time to a consumer NF, and the consumer NF may use the maximum request processing time to dynamically set and adjust SBI response timeout values for producer NFs. FIG. 4 is a message flow diagram illustrating dynamic adjustment of an SBI request message processing timeout at a consumer NF. Referring to FIG. 4, consumer NF 200 is initially configured with a default SBI response timeout of 1000 ms. In step 1, consumer NF 200 sends an SBI request message to producer NF 202. In step 2, consumer NF 200 sets the SBI response timeout for producer NF 202 to 1000 milliseconds, for example, based on the statically configured response timeout value. In step 3, producer NF 202 generates and sends a response to the SBI request message to consumer NF 200. In the response, producer NF 202 includes a Max-Req-Processing-Time header with a maximum SBI request processing time value of 1200 milliseconds. In step 4, consumer NF 200 stores the Max-Req-Processing-Time value of 1200 ms for producer NF 202 in a maximum SBI request processing time database maintained by consumer NF 200.

In step 5, consumer NF 200 sends an SBI request message to producer NF 202. In step 6, consumer NF 200 sets the SBI response timeout to 1200 milliseconds based on the maximum request processing time value received in step 3. In step 7, producer NF 202 sends an SBI response, and the response is received by consumer NF 200 at 1100 milliseconds, which is prior to the expiration of the SBI response timeout. In step 8, consumer NF 200 alternate routes the SBI request from step 5 to producer NF 204. In step 9, consumer NF 200 sets the response timeout for the SBI request to be 1800 milliseconds based on previous Max-Req-Processing-Time input. In step 10, producer NF 204 responds to consumer NF 200. The response is received at 1600 ms, which is within the response timeout period of 1800 ms. The SBI response includes the Max-Req-Processing-Time header with the value of 1800 milliseconds. In step 11, consumer NF 200 stores the maximum request processing time value of 1800 milliseconds for producer NF 204.

Figure 5:
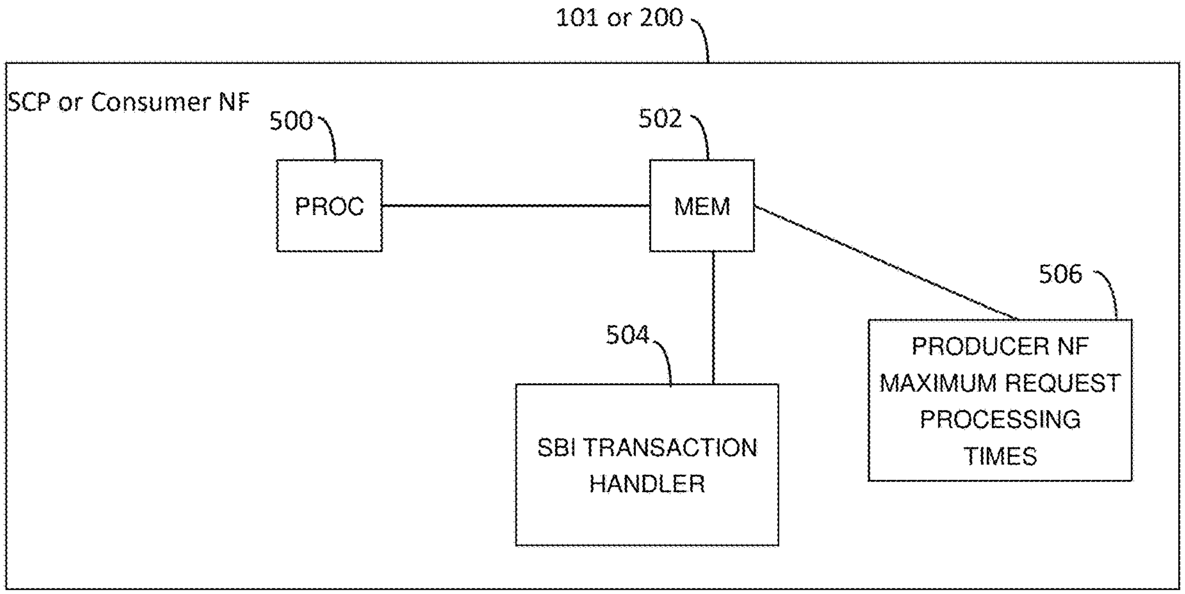
FIG. 5 is a block diagram illustrating an exemplary architecture for a consumer NF or SCP for dynamically adjusting and using an SBI response timeout value.

FIG. 5 is a block diagram illustrating an exemplary architecture for a consumer NF or SCP for dynamically adjusting and using an SBI request message processing timeout value. Referring to FIG. 5, SCP or consumer NF 101 or 200 includes at least one processor 500 and memory 502. SCP or consumer NF 101 or 200 also includes an SBI transaction handler 504. SBI transaction handler 504 receives SBI response messages from producer NFs, reads the maximum request processing time values from the responses, dynamically adjusts the SBI response timeout values, and uses the SBI response timeout values to determine when transactions associated with SBI request messages have timed out. In one example, SBI transaction handler 504 may store or maintain a database 506 of producer NF instance identifiers and corresponding SBI response timeout values obtained from SBI response messages. Table 1 shown below illustrates an example of data that may be included in database 506.

TABLE 1

Maximum SBI Request Processing Times for Producer NFs

| NF Instance ID | Max-Req-Processing-Time |
| --- | --- |
| NF-P1 | 1200 ms |
| NF-P2 | 1400 ms |
| NF-P3 | 1300 ms |

In Table 1, the first column includes NF instance IDs of producer NFs with which SCP or consumer NF 101 or 200 is configured to communicate. The second column includes maximum SBI request processing time values received in responses from the producer NFs. It can be seen from the illustrated example that SCP or consumer NF 101 or 200 may maintain different SBI response timeout values for different producer NFs based on their respective maximum response processing time values that the producer NFs communicate to SCP or consumer NF 101 or 200.

Figure 6:
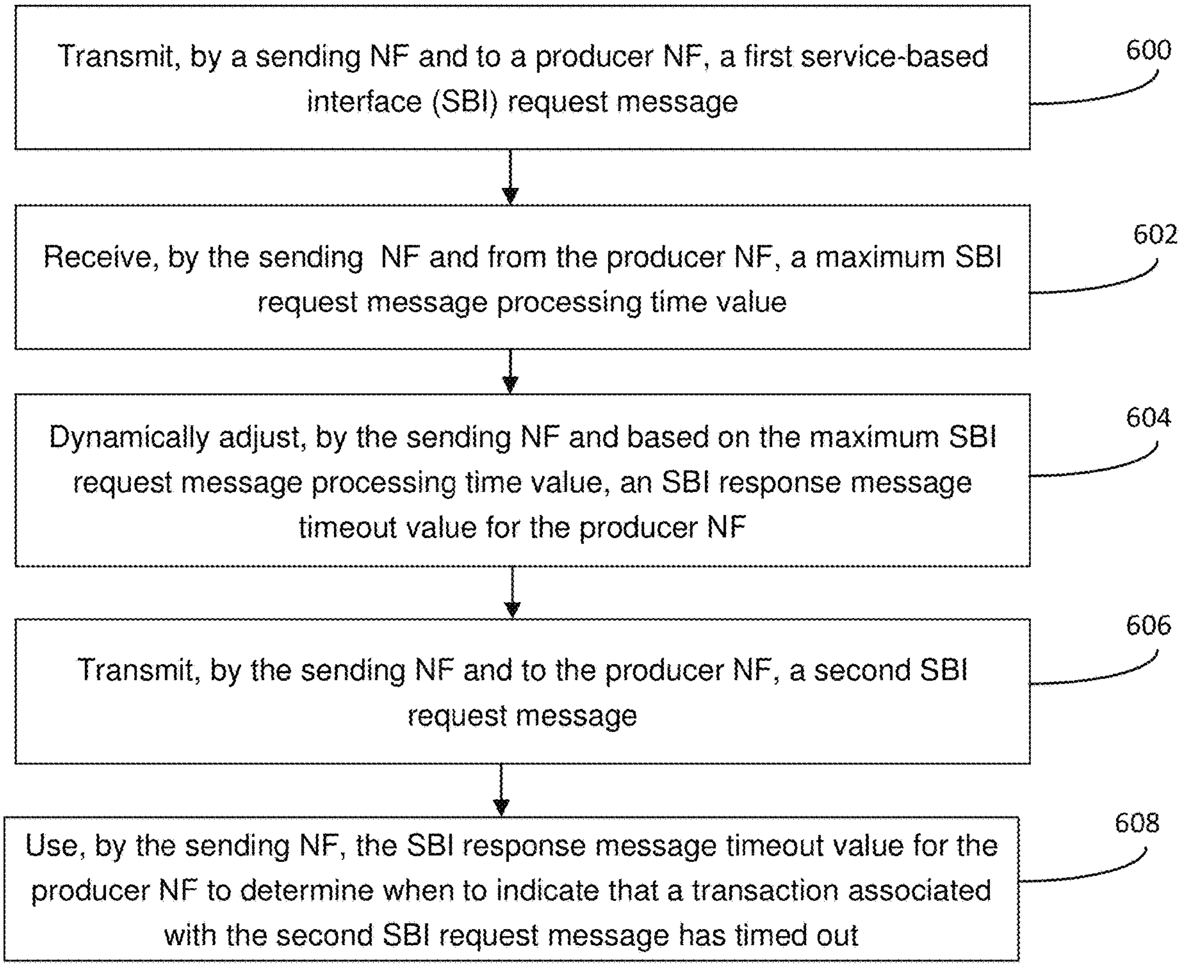
FIG. 6 is a flow chart illustrating an exemplary process for dynamically adjusting and using an SBI response timeout value at a consumer NF or an SCP.

FIG. 6 is a flow chart illustrating an exemplary process for dynamically adjusting and using an SBI response timeout value at a consumer NF or an SCP. Referring to FIG. 6, in step 600, the process includes transmitting, by a sending NF and to a producer NF, a first service-based interface (SBI) request message. For example, a consumer NF or SCP may send an SBI request message to a producer NF.

In step 602, the process further includes receiving, by the sending NF and from the producer NF, a maximum SBI request message processing time value. For example, a producer NF may insert, in an SBI response message, a custom header carrying a maximum SBI request message processing time value. The value may be determined dynamically by the producer NF based on SBI request message processing times of the producer NF or may be configured by the network operator at the producer NF based on SBI request message processing times of the producer NF.

In step 604, the process further includes dynamically adjusting, by the sending NF and based on the maximum SBI request message processing time value, an SBI response timeout value for the producer NF. For example, a consumer NF or SCP may set an SBI response timeout value for a producer NF to be greater than or equal to the maximum SBI request processing time reported by the producer NF. The SBI response timeout value may be set to the maximum SBI request processing time plus an additional time determined by the consumer NF or SCP to account for message transport delay between the producer NF and the consumer NF or SCP.

In step 606, the process further includes transmitting, by the sending NF and to the producer NF, a second SBI request message. For example, a consumer NF or SCP may send a second SBI request message to request service from the producer NF.

In step 608, the process further includes using, by the sending NF, the SBI response timeout value for the producer NF to determine when to indicate that a transaction associated with the second SBI request message has timed out. For example, a consumer NF or SCP may utilize the dynamically set SBI response timeout value to determine when a transaction associated with the second SBI request message has timed out. If a response is not received by the consumer NF or SCP within a time interval indicated by the SBI response timeout value, the consumer NF or SCP may determine that the transaction has timed out.

The following advantages may be achieved at least in part by the subject matter described herein:

Dynamic Response Timeout Adjustment: By receiving and storing the "Max-Req-Processing-Time" from the producer NF, the SCP or consumer NF can dynamically adjust response timeout settings based on the actual processing capabilities of the producer NF. This ensures that response timeouts are tailored to the specific characteristics of each producer NF, thereby reducing the likelihood of premature timeouts or delays.

Improved Resource Utilization: With dynamic response timeout adjustment, the SCP or consumer NF can better allocate network resources by setting response timeouts according to the processing capacity of each producer NF. This optimization minimizes wasting of network resources and enhances overall efficiency in resource utilization.

Enhanced Service Reliability: By using actual SBI request processing time information provided by the producer NF, the SCP or consumer NF can establish response timeout settings that are more closely aligned with the producer NF's capabilities. This reduces the risk of timeouts occurring due to underestimation of processing times, leading to improved service reliability and customer satisfaction.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.7.0 (2024-06)
2. 3rd Generation Partnership Project; Technical Specification Group Core Network and Terminals; 5G System; Technical Realization of Service Based Architecture; Stage 3 (Release 18) 3GPP TS 29.500 V18.6.1 (2024-08)
3. 3rd Generation Partnership Project; Technical Specification Group Services and System Aspects; Procedures for the 5G System (5GS); Stage 2 (Release 18) 3GPP TS 23.502 V18.6.0 (2024-06)
4. 3rd Generation Partnership Project; Technical Specification Group Services and System Aspects; System architecture for the 5G System (5GS); Stage 2 (Release 19) 3GPP TS 23.501 V19.0.0 (2024-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamically adjusting and using producer network function (NF) service-based interface (SBI) response timeout values, the method comprising:

transmitting, by a sending NF and to a producer NF, a first SBI request message;

receiving, by the sending NF and from the producer NF, a maximum SBI request message processing time value;

dynamically adjusting, by the sending NF and based on the maximum SBI request message processing time value, an SBI response timeout value for the producer NF;

transmitting, by the sending NF and to the producer NF, a second SBI request message; and using, by the sending NF, the SBI response timeout value for the producer NF to determine when to indicate that a transaction associated with the second SBI request message has timed out.

2. The method of claim 1 wherein receiving the maximum SBI request message processing time value includes receiving the maximum SBI request message processing time value in an SBI response message transmitted by the producer NF to the sending NF in response to the first SBI request message.

3. The method of claim 2 wherein receiving the maximum SBI request message processing time value in the SBI response message includes receiving the maximum SBI request message processing time value in a Max-Req-Processing-Time header inserted by the producer NF in the SBI response message.

4. The method of claim 1 wherein the maximum SBI request processing time value is dynamically set by the producer NF based on SBI request processing times of the producer NF.

5. The method of claim 1 wherein the maximum SBI request processing time value is configured at the producer NF based on SBI request processing times of the producer NF.

6. The method of claim 1 wherein dynamically adjusting the SBI response timeout value includes setting, by the sending NF, the SBI response timeout value for the producer NF to be equal to the maximum SBI request processing time value of the producer NF.

7. The method of claim 1 wherein dynamically adjusting the SBI response timeout value includes setting, by the sending NF, the SBI response timeout value for the producer NF to be greater than the maximum SBI request message processing time value of the producer NF.

8. The method of claim 1 comprising receiving, by the sending NF and from a plurality of different producer NFs, a plurality of different maximum SBI request message processing time values from the different producer NFs and dynamically setting, by the sending NF and based on the different maximum SBI request message processing time values, different SBI response timeout values for the different producer NFs.

9. The method of claim 1 wherein the sending NF comprises an SCP.

10. The method of claim 1 wherein the sending NF comprises a consumer NF.

11. A system for dynamically adjusting and using producer network function (NF) service-based interface (SBI) response timeout values, the system comprising:

a sending NF including at least one processor and a memory; and a SBI transaction handler stored in the memory and executed by the at least one processor for transmitting, to a producer NF, a first SBI request message, receiving, from the producer NF, a maximum SBI request message processing time value, dynamically adjusting, based on the maximum SBI request message processing time value, an SBI response timeout value for the producer NF, transmitting, to the producer NF, a second SBI request message, and using the SBI response timeout value for the producer NF to determine when to indicate that a transaction associated with the second SBI request message has timed out.

12. The system of claim 11 wherein the SBI transaction handler is configured to receive the maximum SBI request message processing time value in an SBI response message transmitted by the producer NF to the sending NF in response to the first SBI request message.

13. The system of claim 12 wherein the SBI transaction handler is configured to receive the maximum SBI request message processing time value in a Max-Req-Processing-Time header inserted by the producer NF in the SBI response message.

14. The system of claim 11 wherein the maximum SBI request processing time value is dynamically set by the producer NF based on SBI request processing times of the producer NF.

15. The system of claim 11 wherein the maximum SBI request processing time value is configured at the producer NF based on SBI request processing times of the producer NF.

16. The system of claim 11 wherein the SBI transaction handler is configured to dynamically adjust the SBI response timeout value by setting the SBI response timeout value for the producer NF to be greater than or equal to the maximum SBI request message processing time value of the producer NF.

17. The system of claim 11 wherein the SBI transaction handler is configured to receive, from a plurality of different producer NFs, a plurality of different maximum SBI request message processing time values for the different producer NFs and dynamically set, based on the different maximum SBI request message processing time values, different SBI response timeout values for the different producer NFs.

18. The system of claim 11 wherein the sending NF comprises an SCP.

19. The system of claim 11 wherein the sending NF comprises a consumer NF.

20. A non-transitory computer readable medium having stored thereon executable instructions that when executed by a processor of a computer control the computer to perform steps comprising:

transmitting, by a sending network function (NF) and to a producer NF, a first service-based interface (SBI) request message;

receiving, by the sending NF and from the producer NF, a maximum SBI request message processing time value;

dynamically adjusting, by the sending NF and based on the maximum SBI request message processing time value, an SBI response timeout value for the producer NF;

transmitting, by the sending NF and to the producer NF, a second SBI request message; and using, by the sending NF, the SBI response timeout value for the producer NF to determine when to indicate that a transaction associated with the second SBI request message has timed out.

* * * * *